United States Patent
Sako et al.

(10) Patent No.: US 9,869,384 B2
(45) Date of Patent: Jan. 16, 2018

(54) AUTOMATIC TRANSMISSION

(71) Applicant: MAZDA MOTOR CORPORATION, Hiroshima (JP)

(72) Inventors: Kaori Sako, Hiroshima (JP); Tatsutoshi Mizobe, Hiroshima (JP); Shinya Kamada, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/251,776

(22) Filed: Aug. 30, 2016

(65) Prior Publication Data

US 2017/0067553 A1 Mar. 9, 2017

(30) Foreign Application Priority Data

Sep. 4, 2015 (JP) .................................. 2015-175034

(51) Int. Cl.
| | |
|---|---|
| *F16H 57/04* | (2010.01) |
| *F16H 3/66* | (2006.01) |
| *F16H 57/10* | (2006.01) |
| *F16H 61/00* | (2006.01) |
| *F16H 61/30* | (2006.01) |
| *F16H 1/00* | (2006.01) |

(52) U.S. Cl.
CPC ............ *F16H 57/0473* (2013.01); *F16H 1/00* (2013.01); *F16H 3/66* (2013.01); *F16H 57/0435* (2013.01); *F16H 57/0482* (2013.01); *F16H 57/10* (2013.01); *F16H 61/0021* (2013.01); *F16H 61/30* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| | | | | |
|---|---|---|---|---|
| 4,922,765 | A * | 5/1990 | Hayakawa | ............ B60K 17/344 184/6.12 |
| 5,971,719 | A * | 10/1999 | Takeuchi | ............ F16H 61/0009 417/307 |
| 6,202,814 | B1 * | 3/2001 | Braford, Jr. | ......... F16D 25/0638 188/264 E |
| 6,520,293 | B1 * | 2/2003 | Ogawa | ................ F16H 57/0434 184/6.22 |
| 8,087,506 | B2 * | 1/2012 | Haupt | ................... F16D 65/853 188/264 E |
| 9,739,363 | B2 * | 8/2017 | Schweiher | .......... F16H 57/0473 |
| 2009/0308709 | A1 | 12/2009 | Haupt | |

FOREIGN PATENT DOCUMENTS

JP 5498785 B2 5/2014

* cited by examiner

*Primary Examiner* — Dirk Wright

(74) *Attorney, Agent, or Firm* — Studebaker & Brackett PC

(57) ABSTRACT

An automatic transmission is provided with a brake device provided with a rotatable rotation-side friction plate and a non-rotatable fixed-side friction plate; a transmission case which accommodates the brake device; a lubrication oil supply section which supplies lubrication oil introduced into the transmission case to an upper portion of the brake device; and a lubrication oil discharge section disposed below the brake device, and configured to discharge lubrication oil supplied from the lubrication oil supply section to the brake device.

20 Claims, 12 Drawing Sheets

FIG. 3

|  | CL1 | CL2 | CL3 | BR1 | BR2 |
|---|---|---|---|---|---|
| 1ST GEAR POSITION | ○ | × | × | ○(△) | ○ |
| 2ND GEAR POSITION | × | ○ | × | ○ | ○ |
| 3RD GEAR POSITION | ○ | ○ | × | ○ | × |
| 4TH GEAR POSITION | × | ○ | ○ | ○ | × |
| 5TH GEAR POSITION | ○ | × | ○ | ○ | × |
| 6TH GEAR POSITION | ○ | ○ | ○ | × | × |
| 7TH GEAR POSITION | ○ | × | ○ | × | ○ |
| 8TH GEAR POSITION | × | ○ | ○ | × | ○ |
| REVERSE GEAR POSITION | × | × | ○ | ○ | ○ |

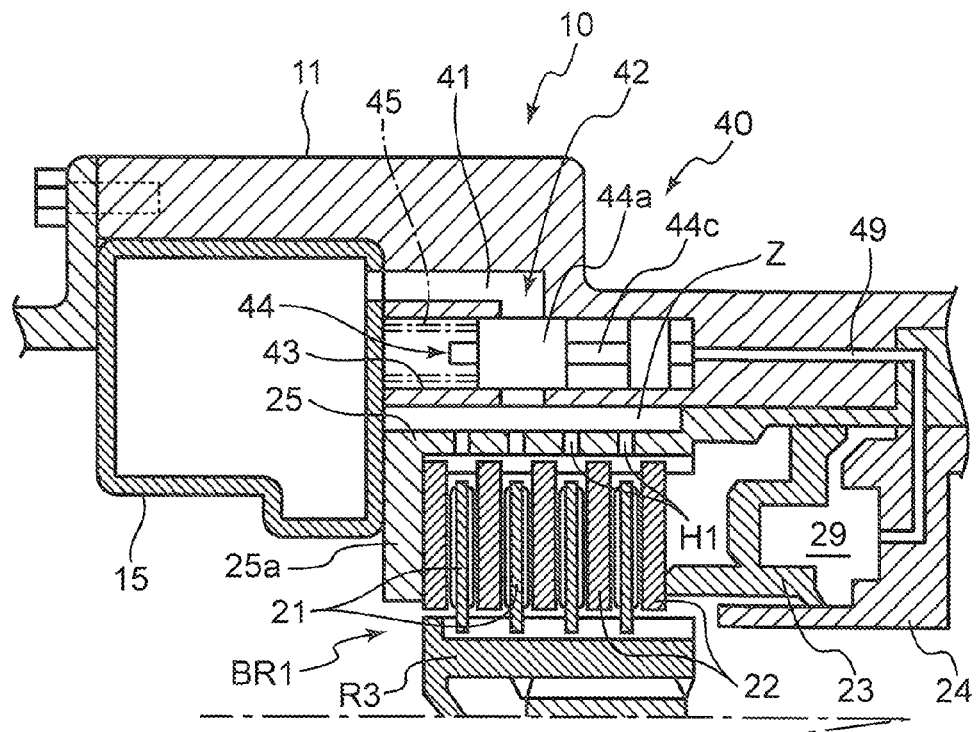
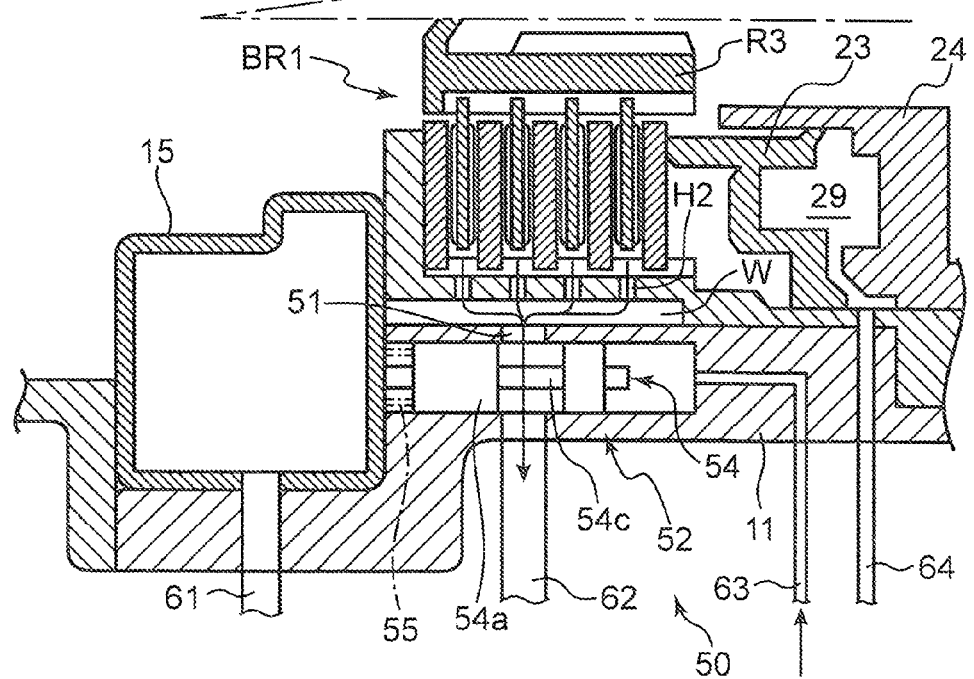
FIG. 7

AUTOMATIC TRANSMISSION

FIELD OF THE INVENTION

The present invention relates to a technique for supplying lubrication oil to a brake device in an automatic transmission.

BACKGROUND ART

A brake device in an automatic transmission includes a rotatable rotation-side friction plate interconnected with a predetermined rotation element, and a non-rotatable fixed-side friction plate disposed to face the rotation-side friction plate. As the rotation-side friction plate and the fixed-side friction plate are brought into pressing contact with each other, rotation of the rotation-side friction plate is stopped (engaged state). As a result of release of the engaged state, rotation of the rotation-side friction plate is allowed (released state). In the brake device having the aforementioned configuration, for instance, when the brake device is switched from a released state to an engaged state, frictional heat due to sliding between the friction plates is generated. In particular, the brake device may be intentionally slip-controlled depending on the type of an automatic transmission. In other words, the brake device may be brought to an incompletely engaged state, When the aforementioned slip-control is performed, the amount of frictional heat generated by the slip-control may increase. This may cause deterioration of the brake device due to the frictional heat.

In view of the above, Japanese Patent No. 5,498,785 proposes supplying lubrication oil from below a brake device to cool the brake device by the lubrication oil in order to protect the brake device from frictional heat.

However, when lubrication oil is supplied from below a brake device as proposed in Japanese Patent No. 5,498,785, it takes time until lubrication oil reaches the upper portion of friction plates. As a result, the lower portion of the friction plates may be intensively cooled, and the upper portion of the friction plates may not be sufficiently cooled.

SUMMARY OF THE INVENTION

In view of the above, an object of the present invention is to provide an automatic transmission that enables to uniformly cool a brake device.

In order to achieve the aforementioned object, an automatic transmission of the present invention is provided with a brake device including a rotatable rotation-side friction plate interconnected with a predetermined rotation element, and a non-rotatable fixed-side friction plate disposed to face the rotation-side friction plate, the brake device being switchable between an engaged state where the friction plates are brought into pressing contact with each other, and a released state where the engaged state is released; a transmission case which accommodates the brake device; a lubrication oil supply section which supplies lubrication oil introduced into the transmission case to an upper portion of the brake device; and a lubrication oil discharge section disposed below the brake device, and configured to discharge lubrication oil supplied from the lubrication oil supply section to the brake device.

According to the automatic transmission of the present invention, it is possible to uniformly cool a brake device, and to advantageously prevent deterioration of the brake device due to heat.

These and other objects, features and advantages of the present invention will become more apparent upon reading the following detailed description along with the accompanying drawings.

BRIEF DESCRIPTION OF THE DRAWINGS

FIG. 3 is an engagement table illustrating a relationship between combinations of engagement/release of friction elements, and gear positions;

FIG. 7 is a diagram for describing an operation to he performed when a brake device is released;

DESCRIPTION OF EMBODIMENTS (1) Schematic Configuration of Automatic Transmission FIG. 2 is a sectional view illustrating a structure of a main portion of the automatic transmission. The automatic transmission illustrated in FIG. 1 and FIG. 2 is mounted in a vehicle, and plays a role of transmitting a driving force to be input from an engine (not illustrated) as a power source of the vehicle to wheels, while shifting gear positions.

Figure 1:
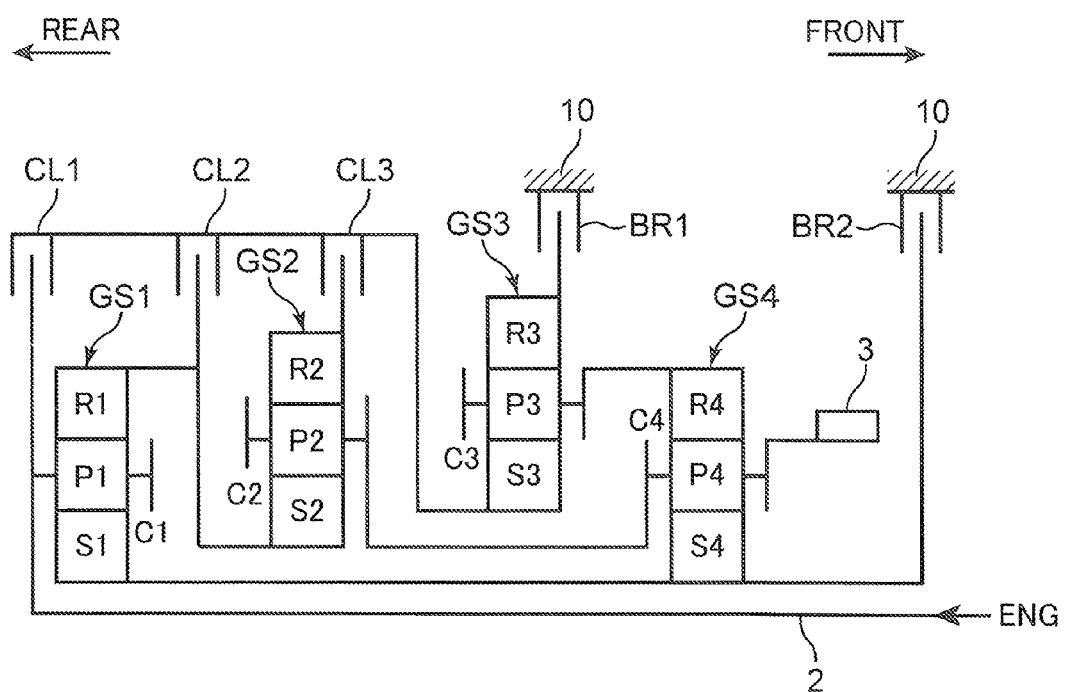
FIG. 1 is a conceptual diagram illustrating a schematic configuration of an automatic transmission according to an embodiment of the present invention.

The automatic transmission includes an input shaft 2 which is driven to rotate by an engine, a plurality of planetary gear sets GS1 to GS4 (hereinafter, simply referred to as gear sets) provided on the input shaft 2, a plurality of clutch devices CL1 to CL3 and a plurality of brake devices BR1 and BR2 for switching a power transmission path via the gear sets GS1 to GS4, an output gear 3 for transmitting an output after gearshift to an external device (a differential mechanism), a transmission case 10 for accommodating the elements therein, and a valve body 60 disposed below the transmission case 10 for supplying and discharging various types of oil (hydraulic oil and lubrication oil). In the following description, a direction parallel to the axial center of the input shaft 2 is referred to as an axial direction, and a direction orthogonal to the axial direction is referred to as a radial direction. Further, one side in the axial direction and close to the engine is referred to as a front side (the right side in the drawings), and the side opposite to the front side is referred to as a rear side (the left side in the drawings).

In the embodiment, the first gear set GS1, the second gear set GS2, the third gear set GS3, and the fourth gear set GS4 are provided as gear sets in the order from the rear side (from the side opposite to the engine). The first clutch CL1, the second clutch CL2, and the third clutch CL3 are provided as clutch devices in the order from the rear side. The first brake BR1 and the second brake BR2 are provided as brake devices in the order from the rear side.

The input shaft 2 includes a first input shaft 2A connected to the engine, and a second input shaft 2B coaxially connected to the first input shaft 2A. The first input shaft 2A is directly connected to the engine, and a torque converter is not provided between the first input shaft 2A and the engine. Specifically, in the technical field of vehicular automatic transmissions, it is often the case that a torque converter as a power transmission device using fluid is provided between an engine and an input shaft. In the embodiment, however, such a torque converter is abolished, and an output of the engine is directly transmitted to the first input shaft 2A.

Any one of the first to fourth gear sets GS1 to GS4 is of a single pinion type. Specifically, the first gear set GS1 includes a sun gear S1, a plurality of pinions P1 engaged with the sun gear S1, a carrier C1 for supporting the pinions P1, and a ring gear R1 engaged with the pinions P1. Likewise, the second gear set GS2 includes a sun gear S2, pinions P2, a carrier C2, and a ring gear R2; the third gear set GS3 includes a sun gear S3, pinions P3, a carrier C3, and a ring gear R3; and the fourth gear set GS4 includes a sun gear S4, pinions P4, a carrier C4, and a ring gear R4.

The input shaft 2 is connected to the carrier C1 of the first gear set GS1. Further, the sun gear S1 of the first gear set GS1 and the sun gear S4 of the fourth gear set GS4 are connected to each other. The ring gear R1 of the first gear set GS1 and the sun gear S2 of the second gear set GS2 are connected to each other. The carrier C2 of the second gear set GS2 and the carrier C4 of the fourth gear set GS4 are connected to each other. The carrier C3 of the third gear set GS3 and the ring gear R4 of the fourth gear set GS4 are connected to each other.

Each of the first and second brakes BR1 and BR2 is configured to disconnectably connect rotation elements of a gear set to the transmission case 10. For instance, the first brake BR1 disconnectably connects the ring gear R3 of the third gear set GS3 to the transmission case 10. Although the details will be described later, the first brake BR1 includes a plurality of friction plates 21 and 22 (see FIG. 2) disposed to face each other in the axial direction. The first brake BR1 disconnectably connects the ring gear R3 to the transmission case 10 by a frictional force between the friction plates 21 and 22. Likewise, the second brake BR2 disconnectably connects the sun gear S4 of the fourth gear set GS4 to the transmission case 10.

Each of the first to third clutches CL1 and CL3 is configured to disconnectably connect a rotation element on the input side to a rotation element on the output side. For instance, the third clutch CL3 disconnectably connects the ring gear R2 of the second gear set GS2 to the sun gear S3 of the third gear set GS3. Although the details will be described later, the third clutch CL3 includes a plurality of friction plates 31 and 32 (see FIG. 2) disposed to face each other in the axial direction. The third clutch CL3 disconnectably connects the ring gear R2 to the sun gear S3 by a frictional force between the friction plates 31 and 32. Likewise, the first clutch CL1 disconnectably connects the carrier C1 of the first gear set GS1 to the sun gear S3 of the third gear set GS3. The second clutch CL2 disconnectably connects the ring gear R1 of the first gear set GS1 to the sun gear S3 of the third gear set GS3.

In the automatic transmission of the embodiment having the aforementioned configuration, as illustrated by the engagement table in FIG. 3, one of first to eighth forward gear positions and a reverse gear position is implemented by engagement of specific friction elements selected from the first to third clutches CL1 to CL3, and the first to second brakes BR1 to BR2. In FIG. 3, the mark "o" denotes that a clutch or a brake is in an engaged state, and the mark "x" denotes that a clutch or a brake is in a released state that the engagement is released.

For instance, when the gear position of the automatic transmission is the first gear position, as illustrated in the second row from the uppermost row in the engagement table, the first clutch CL1, the first brake BR1, and the second brake BR2 are engaged, and the second clutch CL2 and the third clutch CL3 are released. In this example, the mark "Δ" with brackets in the column of the first brake BR1 in the second row denotes that the first brake BR1 is slip-controlled when a vehicle is started and when a vehicle is stopped. Specifically, in the embodiment, a torque converter is not provided between the automatic transmission and the engine, and the input shaft 2 in the automatic transmission is directly connected to the engine. Therefore, as a result of engagement of the first brake BR1 when a vehicle is started and when a vehicle is stopped (in this case, the first gear position is selected), the engine may stall. In view of the above, the first brake BR1 is slip-controlled when a vehicle is started and when a vehicle is stopped to prevent the engine from stalling. Slip-control is an operation of incompletely engaging friction plates in order to transmit power while allowing relative rotation between the friction plates.

(2) Detailed Structure of Brake

Next, a structure of the first brake BR1 which is slip-controlled at e.g. vehicle start and a structure of peripheral parts of the first brake BR1 are described in detail referring to FIG. 2, and FIG. 4 to FIG. 6.

The transmission case 10 includes a first casing 11 for accommodating the first brake BR1, and a second casing 12 formed continuously to a rear portion of the first casing 11 (on the side opposite to the engine), and connected to the first casing 11 by a fastening means such as a bolt.

The first brake BR1 includes a plurality of rotation-side friction plates 21 held on the outer peripheral surface of the ring gear R3 of the third gear set GS3, a plurality of fixed-side friction plates 22 disposed to face the respective rotation-side friction plates 21 in the axial direction, a holding member 25 which holds the fixed-side friction plates 22 while surrounding the fixed-side friction plates 22, a piston 23 which presses the fixed-side friction plates 22 and the rotation-side friction plates 21 in the axial direction, and a piston housing 24 which accommodates the piston 23.

Each of the holding member 25 and the piston housing 24 is fixed to the first casing 11. Specifically, the holding member 25 is fixed to the inner peripheral surface of the first casing 11 by e.g. press fit. The piston housing 24 is fixed to the holding member 25 fixed to the first casing 11 by a fastening means such as a bolt. The holding member 25 includes a retaining plate portion 25a projecting from the rear end thereof in the radial direction.

The fixed-side friction plates 22 are aligned in the axial direction with a small gap. Each of the fixed-side friction plates 22 is held on the inner peripheral surface of the holding member 25 by spline-engagement. Specifically, multitudes of spline grooves extending in the axial direction are formed in the inner peripheral surface of the holding member 25, and multitudes of projections to be engaged in the spline grooves are formed on the outer peripheral surface of each of the fixed-sided friction plates 22. According to this configuration, the fixed-side friction plates 22 are held non-rotatable with respect to the holding member 25. In other words, the fixed-side friction plates 22 are held non-rotatable with respect to the first casing 11 (with respect to the transmission case 10) and movable in the axial direction.

A facing portion 27 (see FIG. 5 and FIG. 6) is formed on both surfaces (on a front surface and a rear surface) of each of the fixed-side friction plates 22 in the axial direction. The facing portions 27 are made of a material having a large frictional coefficient so that a large frictional force is generated accompanied by pressing contact.

The rotation-side friction plates 21 are disposed between each pair of adjacent fixed-side friction plates 22 (in such a manner that each of the rotation-side friction plates 21 and each of the fixed-side friction plates 22 are alternately disposed). Each of the rotation-side friction plates 21 is held on the outer peripheral surface of the ring gear R3 by spline-engagement. Specifically, multitudes of spline grooves extending in the axial direction are formed in the outer peripheral surface of the ring gear R3, and multitudes of projections to be engaged in the spline grooves are formed on the inner peripheral surface of each of the rotation-side friction plates 21. According to this configuration, the rotation-side friction plates 21 are held non-rotatable with respect to the ring gear R3. In other words, the rotation-side friction plates 21 are held integrally rotatable with the ring gear R3, and movable in the axial direction.

The piston 23 is accommodated in the piston housing 24 to be slidable in the axial direction, and is disposed to face the forward-most fixed-side friction plate 22 from the front side. Further, an unillustrated return spring is mounted on the piston 23. The piston 23 is constantly urged forward by the return spring.

An engagement hydraulic chamber 29 is defined between the front surface of the piston 23 and the piston housing 24. Hydraulic oil to be supplied from the valve body 60 through an oil passage 64 is filled in the engagement hydraulic chamber 29.

At the time of engagement of the first brake BR1, the hydraulic pressure of the engagement hydraulic chamber 29 is increased, as oil is supplied from the valve body 60. The piston 23 is driven rearward against the urging force of the return spring by the hydraulic pressure. The rotation-side friction plates 21 and the fixed-side friction plates 22 are brought into pressing contact with each other by being pressed against the retaining plate portion 25a by the piston 23. which is driven rearward, and are brought to a state (an engaged state), in which the rotation-side friction plates 21 and the fixed-side friction plates 22 are non-rotatable relative to each other by a frictional force accompanied by the pressing contact. Specifically, rotation of the rotation-side friction plates 21 is stopped, and rotation of the ring gear R3 is stopped.

On the other hand, at the time of release when the engagement of the first brake BR1 is released, the hydraulic pressure of the engagement hydraulic chamber 29 is lowered to thereby move the piston 23 forward by the urging force of the return spring. Then, the pressing contact between the rotation side friction plates 21 and the fixed-side friction plates 22 is released, and the first brake BR1 is recovered to a state (a released state) that the rotation-side friction plates 21 and the ring gear R3 are rotatable.

Further, when the first brake BR1 is slip-controlled (e.g. when a vehicle is started) a hydraulic pressure smaller than a hydraulic pressure necessary for completely engaging the first brake BR1 (in other words, a hydraulic pressure necessary for completely stopping rotation of the rotation-side friction plates 21) but larger than the urging force of the return spring is supplied to the engagement hydraulic chamber 29, and the rotation-side friction plates 21 and the fixed-side friction plates 22 are brought to an incompletely pressed state. Therefore, at the time of slip-control, the rotation-side friction plates 21 come into rotationally slidable contact with the fixed-side friction plates 22, and frictional heat is generated between the friction plates 21 and 22.

(3) Cooling System of Brake

In the embodiment, a cooling system capable of efficiently supplying lubrication oil to the first brake BR1 is employed in order to protect the first brake BR1 from frictional heat generated at the time of slip-control as described above. Specifically, the automatic transmission of the embodiment is provided with a lubrication oil flow section 15, a lubrication oil supply section 40, and a lubrication oil discharge section 50, as the cooling system.

The lubrication oil flow section 15 is a hollow ring-shaped member internally including a space of a predetermined capacity through which lubrication oil is allowed to flow. The lubrication oil flow section 15 is formed independently of the transmission case 10. The lubrication oil flow section 15 is fixed to the inner peripheral surface of the rear end of the first casing 11 by e.g. press fit in such a manner that the lubrication oil flow section 15 is located near the rear side of the first brake BR1. In other words, the lubrication oil flow section 15 is fixed on the side opposite to the engagement hydraulic chamber 29 with respect to the first brake BR1.

Further, the lubrication oil flow section 15 is disposed to overlap the second gear set GS2 when viewed in the radial direction. Specifically, the lubrication oil flow section 15 is disposed to overlap all the sun gear S2, the pinions P2, and the ring gear R2 of the second gear set GS2 when viewed in the radial direction.

Figure 4:
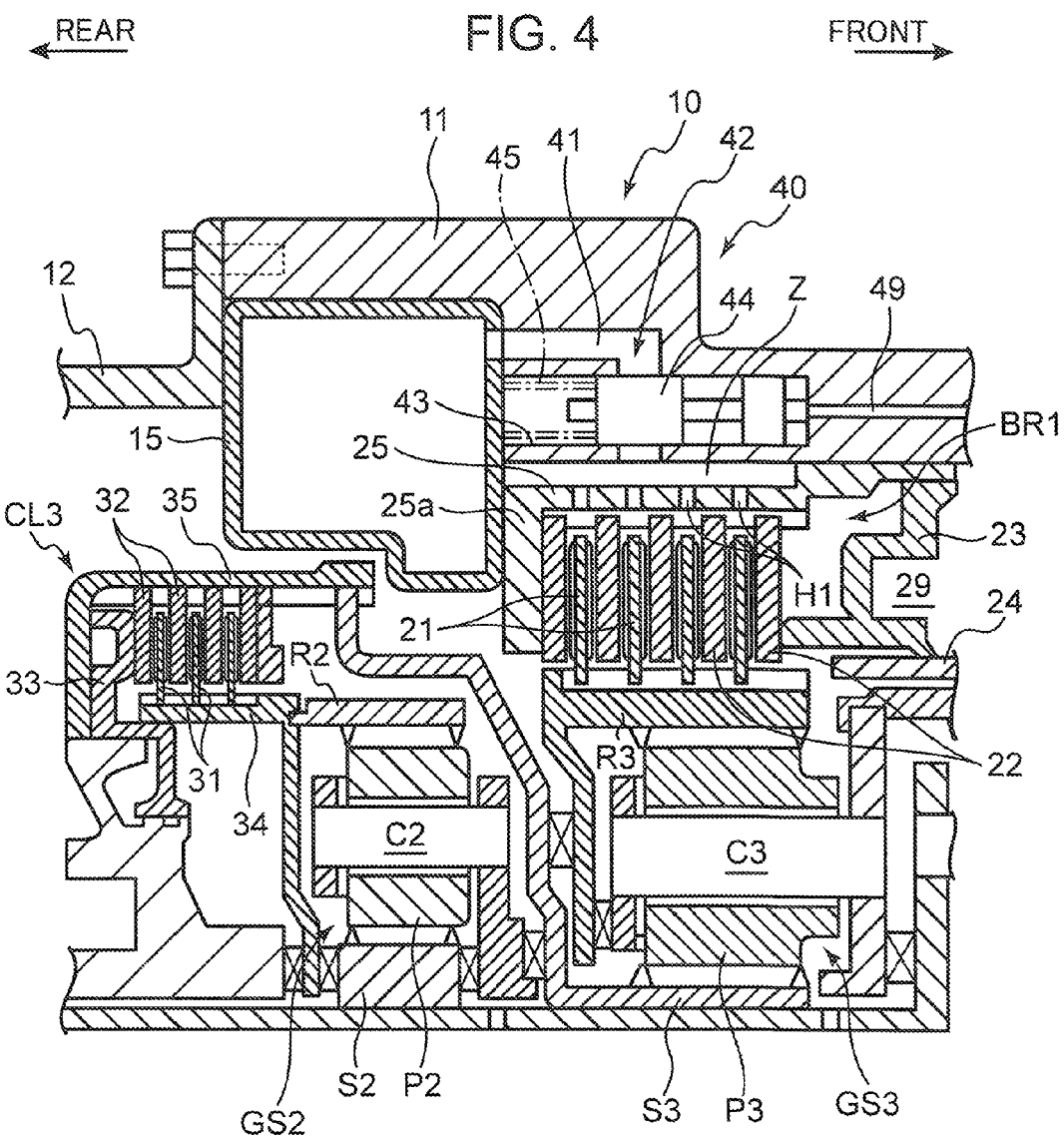
FIG. 4 is a sectional view enlargedly illustrating a part of an upper portion of the automatic transmission.

Further, the lubrication oil flow section 15 is disposed to partially overlap the third clutch CL3 when viewed in the radial direction. Specifically, as illustrated in FIG. 4, the third clutch CL3 includes an inner holding member 34 which is integrally rotated with the ring gear R2 of the second gear set GS2, a plurality of input-side friction plates 31 held on the outer peripheral surface of the inner holding member 34 by spline-engagement, an outer holding member 35 which is integrally rotated with the sun gear S3 of the third gear set GS3, a plurality of output-side friction plates 32 held on the inner peripheral surface of the outer holding member 35 by spline-engagement, and a piston 33 which presses the input-side friction plates 31 and the output-side friction plates 32 in the axial direction. The lubrication oil flow section 15 is disposed with respect to the third clutch CL3 with a positional relationship that a part of the rear portion of the lubrication oil flow section 15 overlaps at least the forward-most friction plate 32 when viewed in the radial direction.

The lubrication oil flow section 15 communicates with the valve body 60 via an oil passage 61. Lubrication oil to be supplied from the valve body 60 is introduced and stored in the lubrication oil flow section 15 through the oil passage 61.

The lubrication oil supply section 40 includes an inlet hole 41 formed in the upper portion of the first casing 11, and a supply control valve 42 for closing or opening, the inlet hole 41.

The inlet hole 41 is formed into an L-shape in section while passing through the upper portion of the first casing 11. An end (rear end) of the inlet hole 41 communicates with the inside of the lubrication oil flow section 15, and the other end (lower end) thereof communicates with an upper clearance Z formed above the first brake BR1. The upper clearance Z is an upper portion of an annular space, which is defined by the first casing 11, the holding member 25, and the lubrication oil flow section 15.

An accommodation hole 43 for accommodating the supply control valve 42 is formed in the upper portion of the first casing 11 in such a manner that the accommodation hole 43 intersects with the inlet hole 41. The rear end of the accommodation hole 43 is opened, but the opening of the accommodation hole 43 is closed by a front wall surface of the lubrication oil flow section 15.

Figure 5:
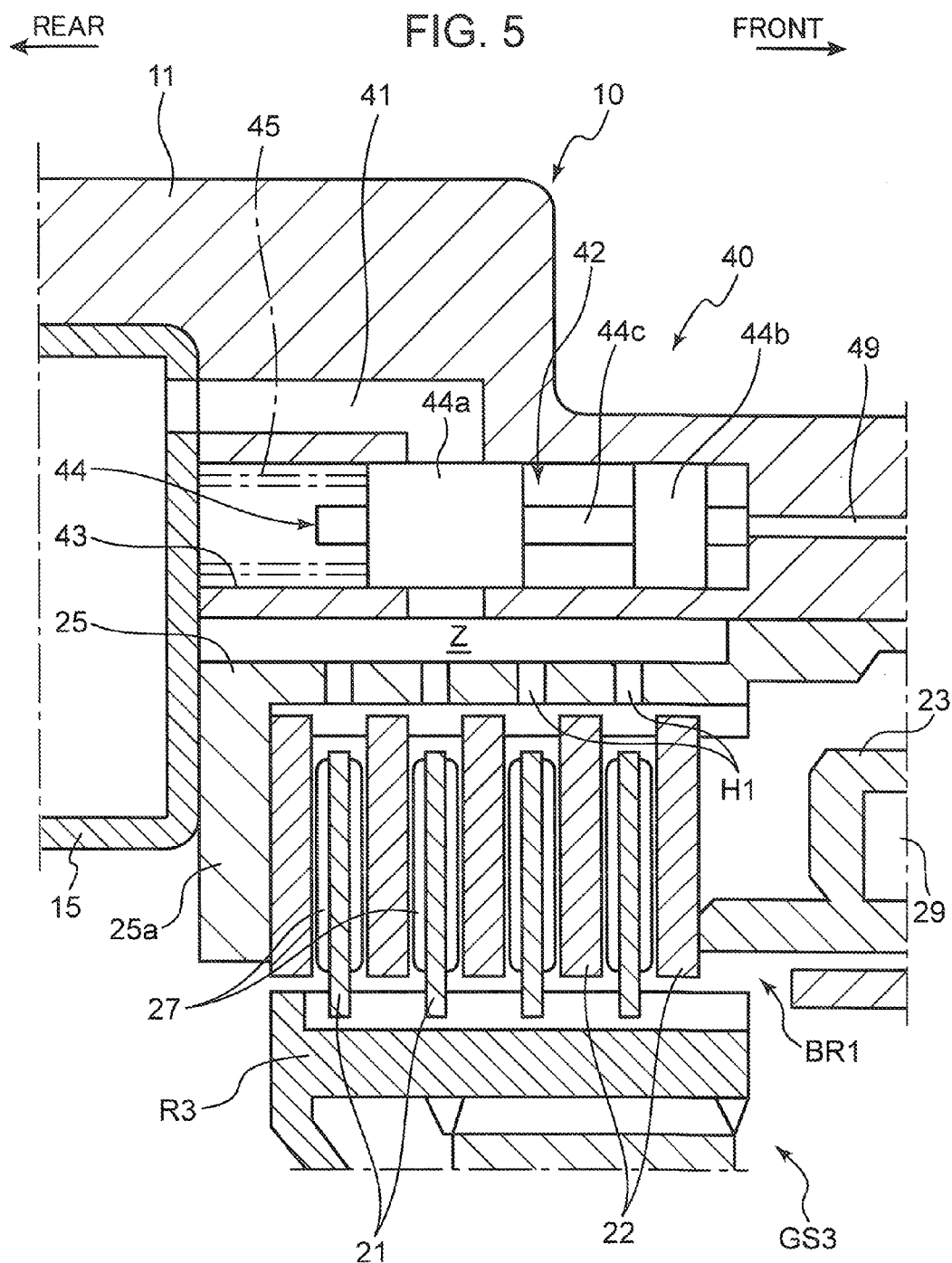
FIG. 5 is an enlarged sectional view for describing a detailed structure of a lubrication oil supply section.

As mainly illustrated in FIG. 5, the supply control valve 42 includes a spool 44 which is slidably accommodated in the accommodation hole 43, and a return spring 45 disposed between the spool 44 and the lubrication oil flow section 15 and configured to urge the spool 44 in the axial direction (toward the front side). The spool 44 includes a first large diameter portion 44a and a second large diameter portion 44b, each of which has an outer diameter substantially equal to the inner diameter of the accommodation hole 43, and a small diameter portion 44c disposed between the first and second large diameter portions 44a and 44b and having an outer diameter smaller than the inner diameter of the accommodation hole 43.

Figure 2:
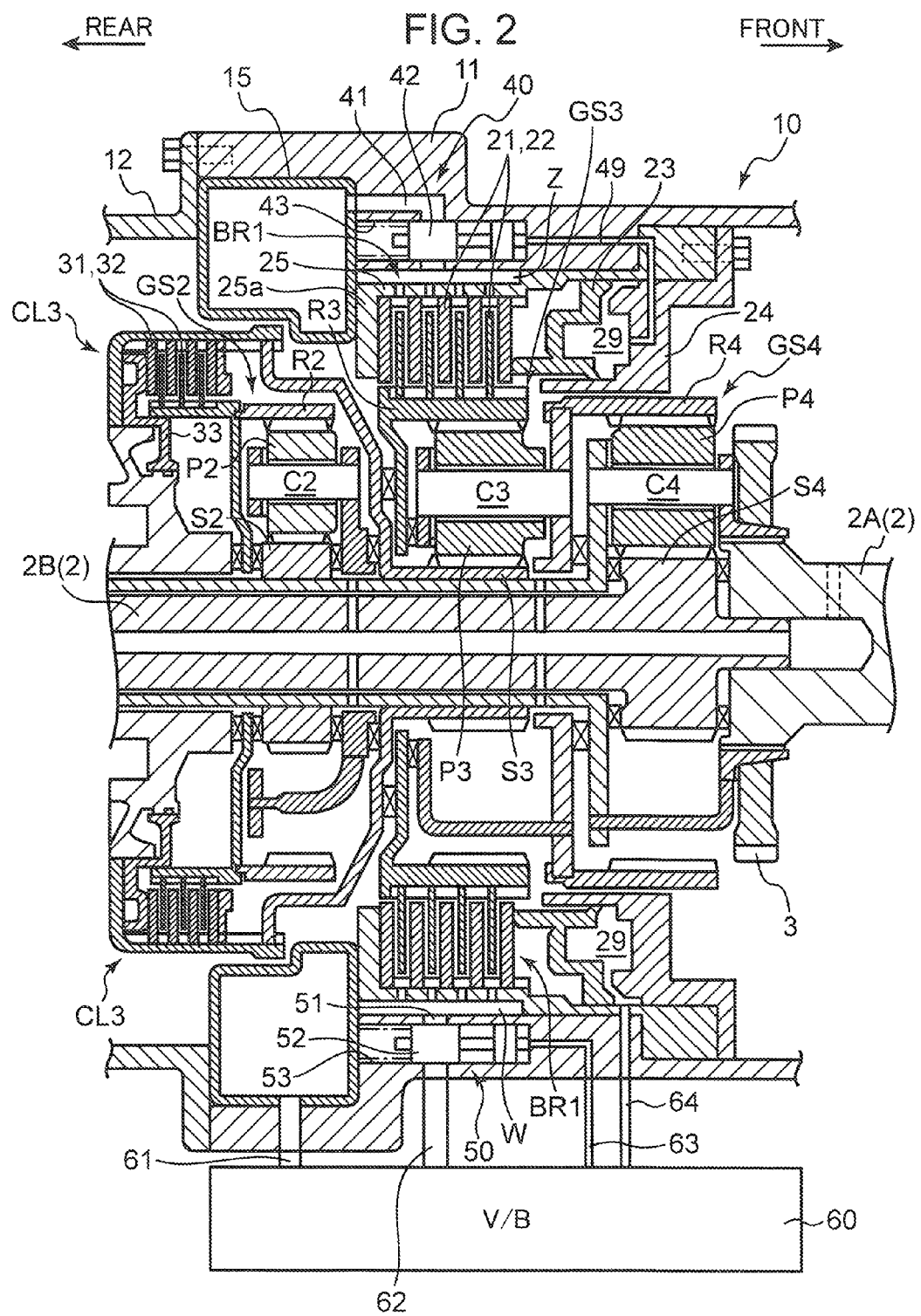
FIG. 2 is a sectional view illustrating a structure of a main portion of the automatic transmission.

As illustrated in FIG. 2, an oil passage 49 extending from the engagement hydraulic chamber 29 for the first brake BR1 communicates with the front end of the accommodation hole 43. The spool 44 is driven forward or rearward depending on the level of hydraulic pressure to be supplied through the oil passage 49. The inlet hole 41 is closed or opened, as the spool 44 is driven forward or rearward. When the hydraulic pressure is small, the spool 44 comes to a front side position shown in FIG. 5, by the urging force of the return spring 45. In this state, the inlet hole 41 is closed by the first large diameter portion 44a. On the other hand, when the hydraulic pressure is increased, the spool 44 is driven rearward against the urging force of the return spring 45, and the small diameter portion 44c comes to face the inlet hole 41, in place of the first large diameter portion 44a (see FIG. 8 to be described later). In other words, the inlet hole 41 is opened. As a result, lubrication oil in the lubrication oil flow section 15 is allowed to flow down into the upper clearance Z through the inlet hole 41.

A plurality of slits Hi passing through the holding member 25 in the radial direction are formed in the upper portion of the holding member 25 facing the upper clearance Z. The slits H1 are formed to supply lubrication oil that flows down into the upper clearance Z through the inlet hole 41 to each of the rotation-side friction plates 21 and to each of the fixed-side friction plates 22 located inside the holding member 25.

Figure 6:
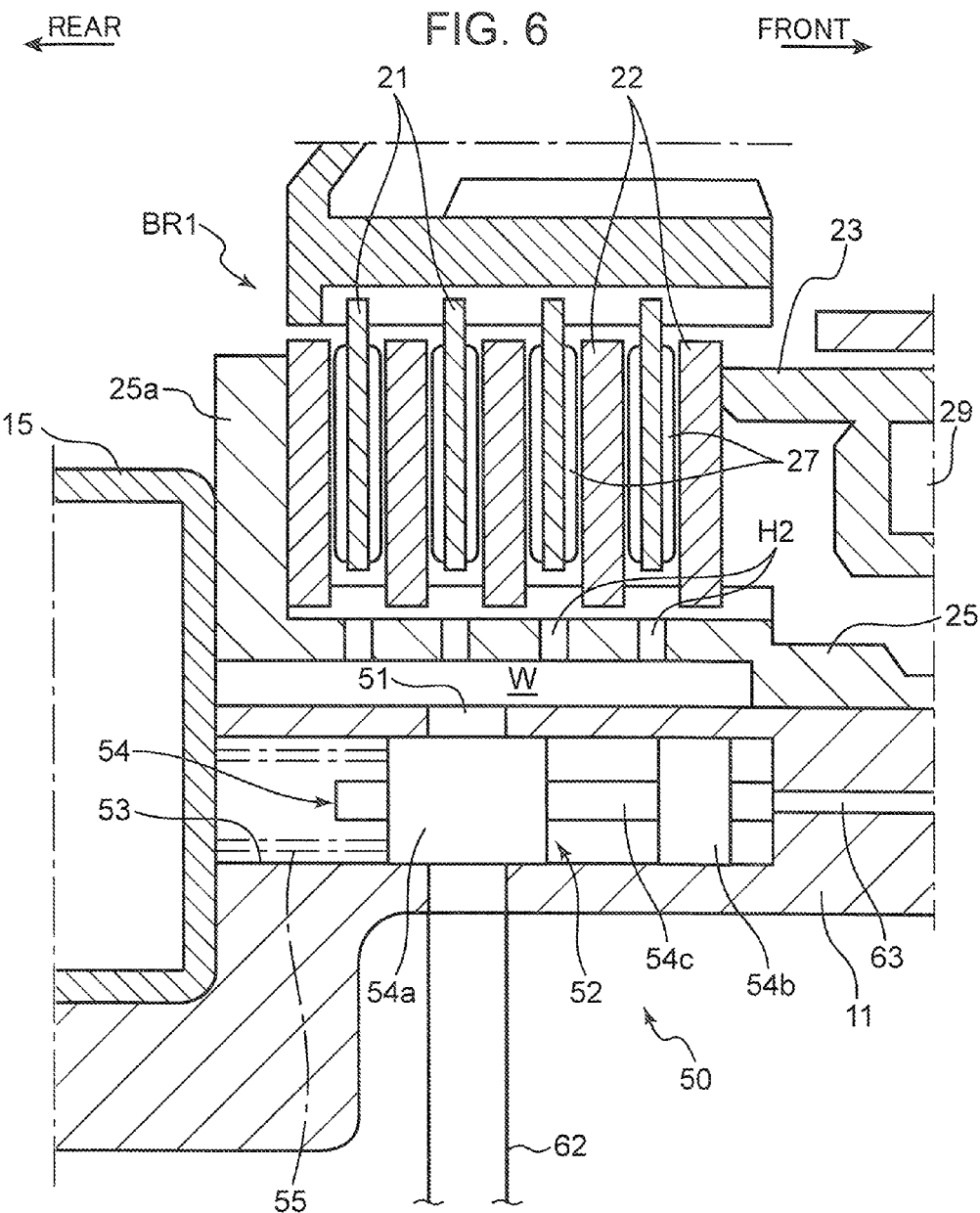
FIG. 6 is an enlarged sectional view for describing a detailed structure of a lubrication oil discharge section.

As illustrated in FIG. 2 and FIG. 6, the lubrication oil discharge section 50 includes a discharge hole 51 formed in the lower portion of the first casing 11, and a discharge control valve 52 for closing or opening the discharge hole 51.

The discharge hole 51 is formed to pass through the lower portion of the first casing 11 in the radial direction (in the up-down direction). The upper end of the discharge hole 51 communicates with a lower clearance W formed below the first brake BR1, and the lower end of the discharge hole 51 communicates with the valve body 60 via an oil passage 62. The lower clearance W is a lower portion of the annular space, which is defined by the first casing 11, the holding member 25, and the lubrication oil flow section 15.

An accommodation hole 53 for accommodating the discharge control valve 52 is formed in the lower portion of the first casing 11 in such a manner that the accommodation hole 53 intersects with the discharge hole 51. The rear end of the accommodation hole 53 is opened, but the opening of the accommodation hole 53 is closed by the front wall surface of the lubrication oil flow section 15.

As mainly illustrated in FIG. 6, the discharge control valve 52 includes a spool 54 which is slidably accommodated in the accommodation hole 53, and a return spring 55 disposed between the spool 54 and the lubrication oil flow section 15 and configured to urge the spool 54 in the axial direction (toward the front side). The spool 54 includes a first large diameter portion 54a and a second large diameter portion 54b, each of which has an outer diameter substantially equal to the inner diameter of the accommodation hole 53, and a small diameter portion 54c disposed between the first and second large diameter portions 54a and 54b and having an outer diameter smaller than the inner diameter of the accommodation hole 53.

As illustrated in FIG. 2, an oil passage 63 extending from the valve body 60 communicates with the front end of the accommodation hole 53. The spool 54 is driven forward or rearward depending on the level of hydraulic pressure to be supplied through the oil passage 63. The discharge hole 51 is closed or opened, as the spool 54 is driven forward or rearward. When the hydraulic pressure is small, the spool 54 comes to a front side position shown in FIG. 6, by the urging force of the return spring 55. In this state, the discharge hole 51 is closed by the first large diameter portion 54a. On the other hand, when the hydraulic pressure is increased, the spool 54 is driven rearward against the urging force of the return spring 55, and the small diameter portion 54c comes to face the discharge hole 51, in place of the first large diameter portion 54a (see FIG. 7 to be described later). In other words, the discharge hole 51 is opened. In this case, when lubrication oil remains in the lower clearance W, the lubrication oil is allowed to flow down toward the valve body 60 through the discharge hole 51.

A plurality of slits 112 passing through the holding member 25 in the radial direction are formed in the lower portion of the holding member 25 facing the lower clearance W. The slits H2 are formed to let lubrication oil supplied to the rotation-side friction plates 21 and the fixed-side friction plates 22 flow down into the lower clearance W.

Next, an operation of the lubrication oil supply section 40 and the lubrication oil discharge section 50 associated with states of the first brake BR1 is described.

First of all, an operation to be performed when the first brake BR is released is described using FIG. 7. When the first brake BR1 is released, the hydraulic pressure of the engagement hydraulic chamber 29 is small. Therefore, the hydraulic pressure of the oil passage 49 communicating from the engagement hydraulic chamber 29 to the supply control valve 42 is also small. Consequently, the spool 44 of the supply control valve 42 is retained at a front side position where it is possible to close the inlet hole 41. Further, as a result of closing of the inlet hole 41, supply of lubrication oil from the lubrication oil flow section 15 through the inlet hole 41 is prohibited. Furthermore, in the discharge control valve 52, the hydraulic pressure of the oil passage 63 communicating from the valve body 60 to the discharge control valve 52 is increased to thereby drive the spool 54 rearward. As a result, the discharge hole 51 is opened. According to the aforementioned configuration, even when lubrication oil remains in the lower portion of the first brake BR1, the lubrication oil is allowed to flow down through the slits H2 in the holding member 25, through the lower clearance W, and through the discharge hole 51; and is returned to the valve body 60 through the oil passage 62. In this way, when the first brake BR1 is released, supply of lubrication oil from the lubrication oil flow section 15 to the first brake BR1 is prohibited. and the discharge hole 51 is opened so that lubrication oil does not remain. This makes it possible to reduce so-called drag resistance, without obstruction of rotation of the rotation-side friction plates 21 by lubrication oil.

Figure 8:
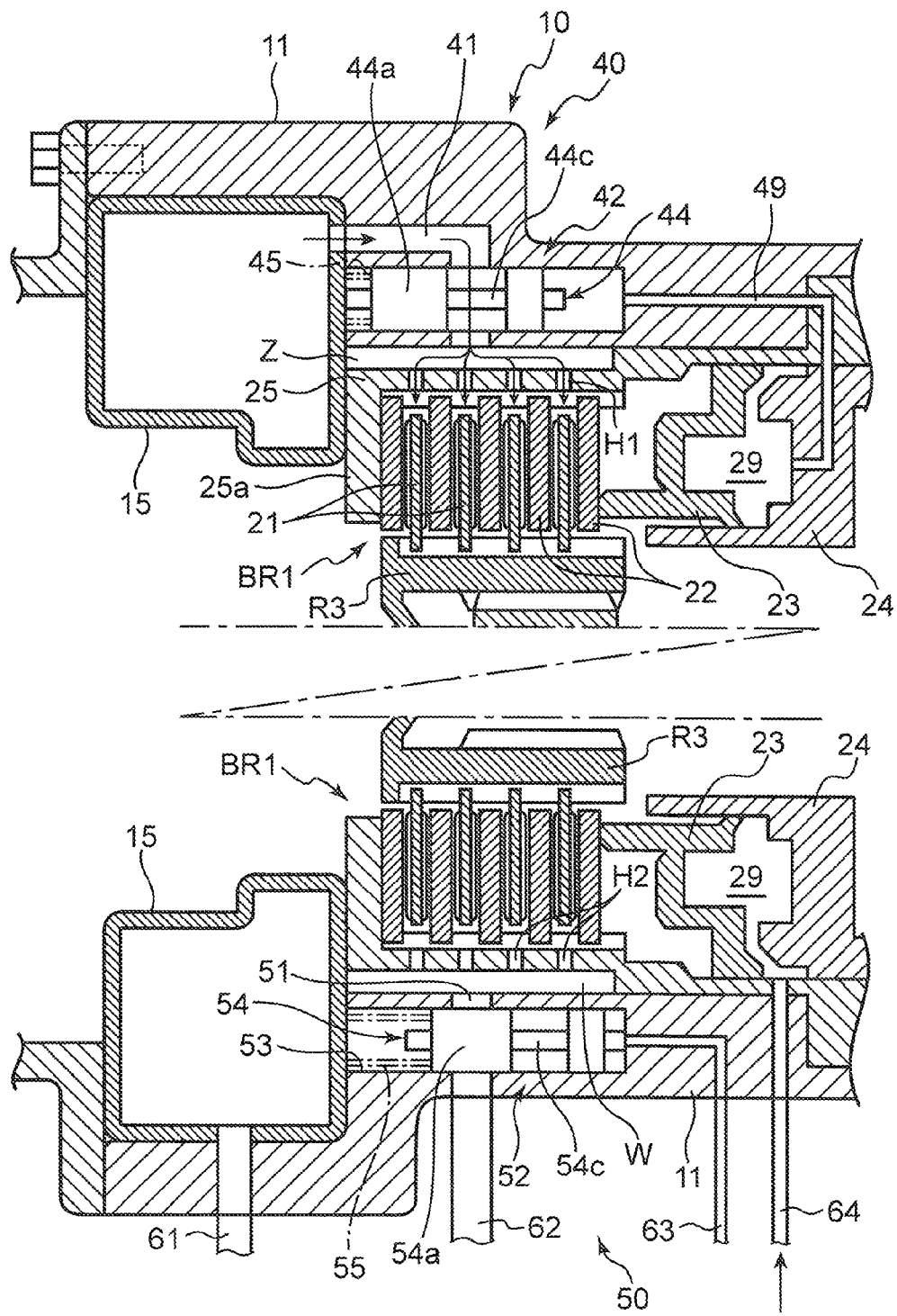
FIG. 8 is a diagram for describing an operation to be performed when the brake device is slip-controlled.

On the other hand, for instance, when slip-control of the first brake BR1 is started after a vehicle is started, the hydraulic pressure of the engagement hydraulic chamber 29 is increased, and as a result, the hydraulic pressure of the oil passage 49 is also increased. Then, as illustrated in FIG. 8, the spool 44 of the supply control valve 42 is driven rearward, and the inlet hole 41 is opened. Further, as the inlet hole 41 is opened, lubrication oil in the lubrication oil flow section 15 is allowed to flow down through the inlet hole 41. The lubrication oil that flows down is supplied to the upper portion of the friction plates 21 and 22 of the first brake BR1 through the upper clearance Z and through the slits 111 in the holding member 25. Lubrication oil supplied to the upper portion of the friction plates 21 and 22 is allowed to flow down by the gravitational force, spreads over the entirety of the friction plates 21 and 22, and thereafter, reaches the inner surface of the lower portion of the holding member 25. Further, in the discharge control valve 52, the hydraulic pressure of the oil passage 63 is lowered, and as a result, the spool 54 is retained at a position where it is possible to close the discharge hole 51. In this way, by supplying lubrication oil from the inlet hole 41 in a state that the discharge hole 51 is closed, it is possible to store a large amount of lubrication oil in the first brake BR1 and in the vicinity of the first brake BR1. Thus, the first brake BR1 is cooled by the lubrication oil.

(4) Advantageous Effects

As described above, the automatic transmission of the embodiment includes the lubrication oil supply section 40 for supplying lubrication oil introduced from the valve body 60 into the transmission case 10 (into the lubrication oil flow section 15) onto the upper portion of the first brake BR1, and the lubrication oil discharge section 50 disposed below the first brake BR1 and configured to discharge lubrication oil supplied from the lubrication oil supply section 40 to the first brake BR1 onto the valve body 60. This is advantageous in uniformly cooling the first brake BR1.

Specifically, in the embodiment, lubrication oil is supplied from the lubrication oil supply section 40 to the upper portion of the first brake BR1. This makes it possible to efficiently supply lubrication oil to the upper portion of the first brake BR1 where lubrication oil is generally less likely to reach. This is advantageous in preventing deterioration of the upper portion of the first brake BR1 by heat. For instance, let us consider a structure of a general automatic transmission, in which a lubrication oil storage portion (such as a valve body) is disposed below a transmission case. In this case, typically, lubrication oil is supplied from below the transmission case, or is supplied from a power transmission shaft (e.g. a second input shaft) located at the middle of the transmission case, in order to cool a first brake by lubrication oil. However, if lubrication oil is supplied from below the transmission case or from the middle of the transmission case, although lubrication oil is securely supplied to the lower portion of the first brake, lubrication oil is less likely to reach the upper portion of the first brake in a condition that the rotation speed of rotation-side friction plates is low (in other words, in a condition that a centrifugal force to be applied to lubrication oil is small). As a result, the upper portion of the first brake may be easily deteriorated by heat. On the other hand, in the embodiment, in which lubrication oil is supplied from the lubrication oil supply section 40 to the upper portion of the first brake BR1, lubrication oil of a low temperature is securely supplied to the upper portion of the first brake BR1, and the supplied lubrication oil spreads over the entirety of the first brake BR1 by the gravitational force. This makes it possible to uniformly cool the first brake BR1. This is advantageous in preventing deterioration of the first brake BR1 by heat. Further, lubrication oil is discharged from the lubrication oil discharge section 50 formed below the first brake BR1. This makes it possible to speedily discharge lubrication oil when lubrication oil is not necessary. This is advantageous in reducing drag resistance of the rotation-side friction plates 21.

In particular, in the embodiment, a torque converter is not provided between the automatic transmission and the engine, and the first brake BR1 is slip-controlled when a vehicle is started, for instance, in place of using a torque converter. This may raise the temperature of the first brake BR1 high, as compared with the other friction elements. However, in the embodiment, lubrication oil is supplied from the lubrication oil supply section 40 when the first brake BR1 is slip-controlled. This makes it possible to efficiently cool the first brake BR1 by the lubrication oil, and to appropriately protect the first brake BR1 from frictional heat generated at the time of slip-control.

Further, in the embodiment, the supply control valve 42 is provided in the lubrication oil supply section 40, and the discharge control valve 52 is provided in the lubrication oil discharge section 50. This makes it possible to appropriately control supply of lubrication oil to the first brake BR1. and discharge of lubrication oil from the first brake BR1 with use of the supply control valve 42 and the discharge control valve 52.

Further, in the embodiment, the supply control valve 42 is controlled by a hydraulic pressure to be supplied to the engagement hydraulic chamber 29 for use in engaging the first brake BR1. Therefore, it is possible to drive the supply control valve 42 in association with increasing the hydraulic pressure of the engagement hydraulic chamber 29 when the first brake BR1 is slip-controlled, and to securely supply lubrication oil to the first brake BR1 at the time of slip-control when it is necessary to cool the first brake BR1.

Further, in the embodiment, the lubrication oil flow section 15 for allowing flow of lubrication oil introduced from the valve body 60 is mounted on the transmission case 10. This makes it possible to securely guide lubrication oil stored in the valve body 60 formed below the transmission case 10 to the lubrication oil supply section 40, which is disposed above the transmission case 10, through the lubrication oil flow section 15.

In particular, in the embodiment, the lubrication oil flow section 15 is formed independently of the transmission case 10. Therefore, the degree of freedom in shaping the lubrication oil flow section 15 is high. This makes it possible to secure a sufficient space within the lubrication oil flow section 15. Thus, it is possible to supply lubrication oil of a sufficient amount from the lubrication oil flow section 15 to the lubrication oil supply section 40. This is advantageous in enhancing the cooling performance with respect to the first brake BR1.

Further, in the embodiment, the lubrication oil flow section 15 is mounted on the transmission case 10 with a positional relationship that at least a part of the lubrication oil flow section 15 overlaps the second gear set GS2 and the third clutch CL3 when viewed in the radial direction. This makes it possible to prevent oversizing of the automatic transmission in the axial direction accompanied by addition of the lubrication oil flow section 15 as much as possible. Therefore, it is possible to appropriately secure an oil passage through which lubrication oil of a sufficient amount is allowed to flow within the lubrication oil flow section 15, while making the automatic transmission compact in the axial direction.

Further, in the embodiment, the engagement hydraulic chamber 29 is disposed on the front side of the first brake BR1, and the lubrication oil flow section 15 is disposed on the rear side of the first brake BR1, which is opposite to the engagement hydraulic chamber 29. This makes it possible to eliminate an influence such as constraints in the installation area of the lubrication oil flow section 15 due to the existence of the engagement hydraulic chamber 29. This is advantageous in sufficiently securing the capacity of the lubrication oil flow section 15.

(5) Modifications

In the embodiment, lubrication oil is supplied to the upper portion of the first brake BR1 by causing lubrication oil to flow down from the inlet hole 41 in the lubrication oil supply section 40. The supply method, however, is not limited to the above, as far as it is possible to supply lubrication oil to the upper portion of the first brake BR1. For instance, it is possible to supply lubrication oil to the upper portion of the first brake BR1 from the front side or from the rear side, and to spread the lubrication oil over each of the friction plates 21 and 22 through spline grooves formed in the upper portion of the holding member 25.

Further, in the embodiment, the lubrication oil flow section 15 is mounted independently on the inner surface of the transmission case 10. Alternatively, the lubrication oil flow section 15 may be integrally formed with the transmission case 10.

Further, in the embodiment, the first brake BR1 is engaged with use of the piston 23 to be driven by a hydraulic pressure from the engagement hydraulic chamber 29. When the engaged first brake BR1 is released, the piston 23 is retracted by reducing the hydraulic pressure of the engagement hydraulic chamber 29, namely, by the urging force of the return spring. Alternatively, it is possible to release the first brake BR1 by providing a release hydraulic chamber independently of the engagement hydraulic chamber 29, and by pushing the piston 23 back by a hydraulic pressure to be supplied to the release hydraulic chamber.

Further, in the embodiment, the hydraulically driven supply control valve 42 is provided in the lubrication oil supply section 40, and the supply control valve 42 is driven by a hydraulic pressure to be supplied to the engagement hydraulic chamber 29. Alternatively, the supply control valve 42 may be operated in such a manner that lubrication oil is supplied at least at the time of slip-control of the first brake BR1. Various methods other than the above may be proposed for implementing the aforementioned operation. For instance, when a hydraulic pressure of the engagement hydraulic chamber 29 is directly supplied to the supply control valve 42 as described in the embodiment, lubrication oil is supplied through the inlet hole 41 not only during slip-control of the first brake BR1 but also during complete engagement of the first brake BR1. In view of the above, a shut-off valve may be provided at an appropriate position on the oil passage 49 for connecting the engagement hydraulic chamber 29 and the supply control valve 42, and supply of lubrication oil may be stopped by the shut-off valve when the first brake BR1 is completely engaged.

Further, in the embodiment, supply and discharge of lubrication oil with respect to the first brake BR1 is controlled with use of the supply control valve 42 including the spool 44 to be driven by a hydraulic pressure, and the discharge control valve 52 including the spool 54 to be driven by a hydraulic pressure. Alternatively, supply and discharge of lubrication oil may be controlled with use of e.g. an electromagnetic solenoid valve.

Further, the embodiment is an example, in which the present invention is applied to an automatic transmission to be mounted in a vehicle in which a torque converter is abolished. The present invention, however, is also applicable to a conventional automatic transmission connected to an engine via a torque converter.

Further, the embodiment is an example, in which the present invention is applied to a multi-stager automatic transmission. The automatic transmission to which the present invention can be applied, however, is not limited to the above, as far as it is provided with a brake device. For instance, the present invention can be applied to a continuously variable transmission (CVT).

Further various modifications are applicable to the supply control valve and to the discharge control valve. In the following, some of the specific modifications of the discharge control valve are described.

Figure 9:
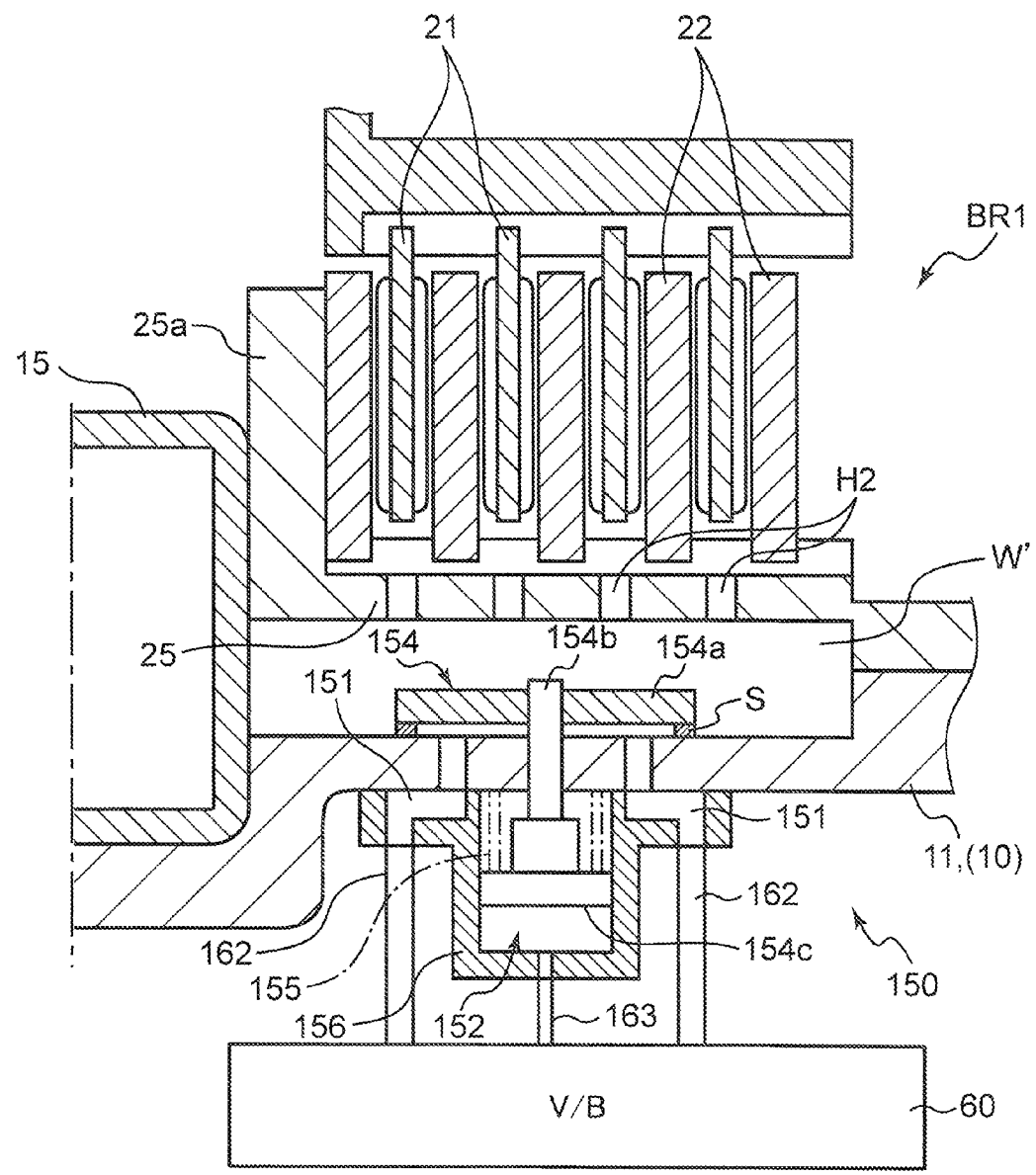
FIG. 9 is a diagram for describing a first modification of the embodiment.

FIG. 9 illustrates a lubrication oil discharge section 150 as a first modification. In FIG. 9 and the drawings thereafter. the same constituent elements as those in the embodiment (see FIG. 1 to FIG. 8) are indicated with the same reference numerals, and description thereof is omitted herein. As illustrated in FIG. 9, the lubrication oil discharge section 150 is provided with a discharge hole 151 for discharging lubrication oil flowing down from a first brake BR1 through lower-side slits H2 to the outside of a transmission case 10 (a first casing 11), a discharge control valve 152 for controlling discharge of lubrication oil through the discharge hole 151, and a cap member 156 mounted on the lower surface of the transmission case 10 in such a manner as to accommodate the lower portion of the discharge control valve 152.

The discharge control valve 152 includes a valve body 154 and a return spring 155. The valve body 154 includes a shaft portion 154b formed to pass through the lower portion of the transmission case 10 in the up-down direction, an umbrella portion 154a formed at the upper end of the shaft portion 154b, which is located inside the transmission case 10 (located in a lower clearance W'), and a pressed portion 154c formed at the lower end of the shaft portion 154b, which is located on the outside of the transmission case 10 (located inside the cap member 156). A seat portion S which is sealably pressed against the transmission case 10 is mounted on the lower surface of the periphery of the umbrella portion 154a. The return spring 155 is disposed between the pressed portion 154c and the lower surface of the transmission case 10, and urges the valve body 154 downward.

The discharge hole 151 is formed to continuously pass through the transmission case 10 and through the cap member 156 on the lower side of the umbrella portion 154a.

The cap member 156 is connected to oil passages 162 and 163 extending from a valve body 60. The oil passage 162 is communicatively connected to the discharge hole 151, and the oil passage 163 is communicatively connected to the inner space of the cap member 156 (a space between the lower surface of the cap member 156 and the pressed portion 154c).

In the lubrication oil discharge section 150 as the first modification as described above. when it is not necessary to discharge lubrication oil, for instance, at the time of slip-control of the first brake BR1 when cooling by lubrication oil is necessary, the hydraulic pressure of hydraulic oil to be supplied into the cap member 156 through the oil passage 163 is made small. Then, as illustrated in FIG. 9, the valve body 154 is pressed downward by the urging force of the return spring 155, and the seat portion S is sealably pressed against the transmission case 10. In this state, the upper surface of the discharge hole 151 is substantially closed. This makes it possible to prohibit discharge of lubrication oil through the discharge hole 151.

Figure 10:
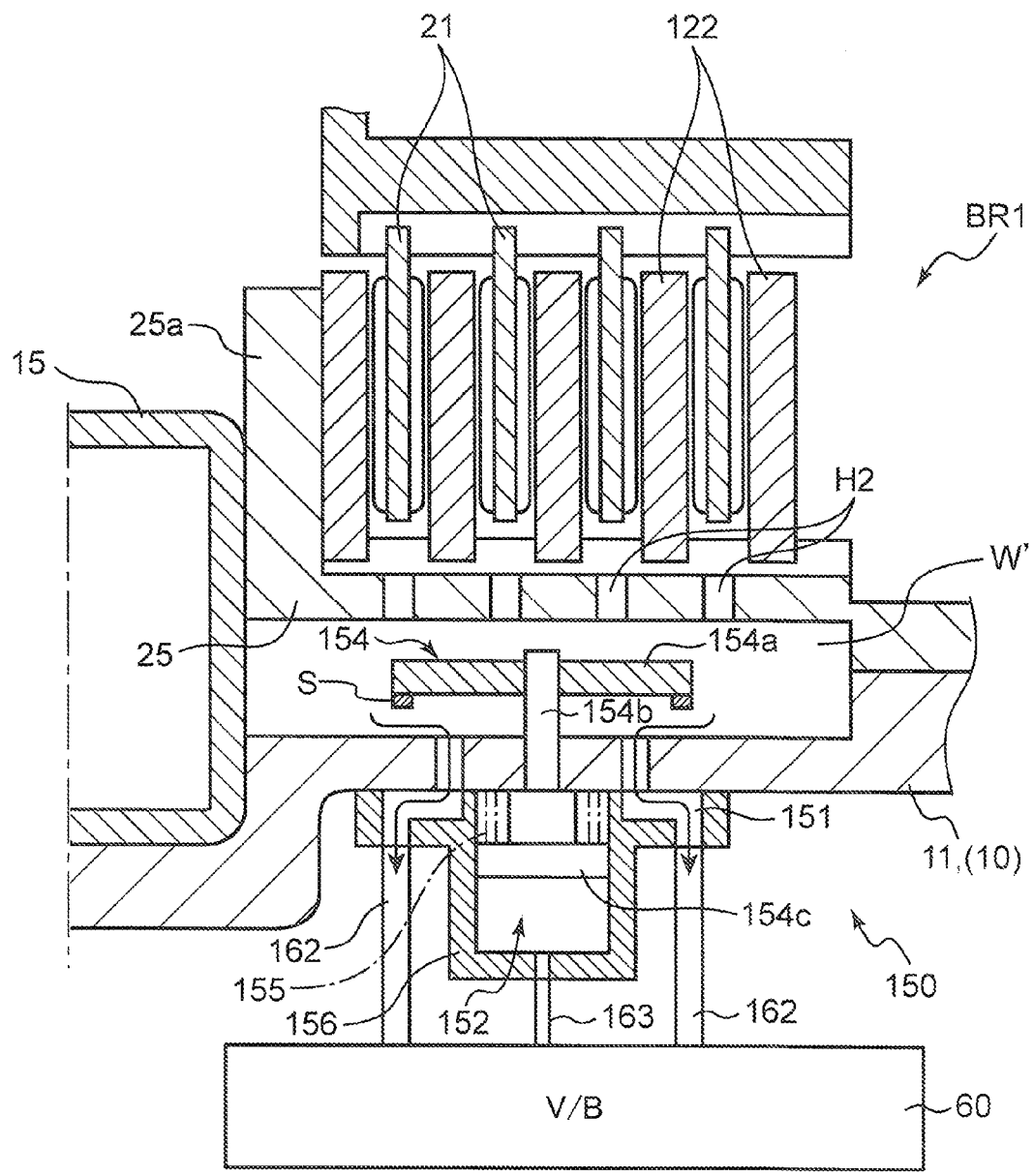
FIG. 10 is a diagram for describing an operation of a discharge control valve in the first modification.

On the other hand, for instance, when the first brake BR1 is released, the hydraulic pressure of hydraulic oil to be supplied into the cap member 156 through the oil passage 163 is made large. Then, as illustrated in FIG. 10, the valve body 154 is pressed upward against the urging force of the return spring 155. and the upper surface of the discharge hole 151 is opened. For instance, when lubrication oil remains in the lower clearance W' in this state, the lubrication oil is discharged to the valve body 60 through the discharge hole 151 and through the oil passage 162.

The discharge control valve 152 as the first modification is configured to open the discharge hole 151 when a hydraulic pressure is applied. Alternatively, the configuration may be reversed. A specific example in this case is described as a second modification.

Figure 11:
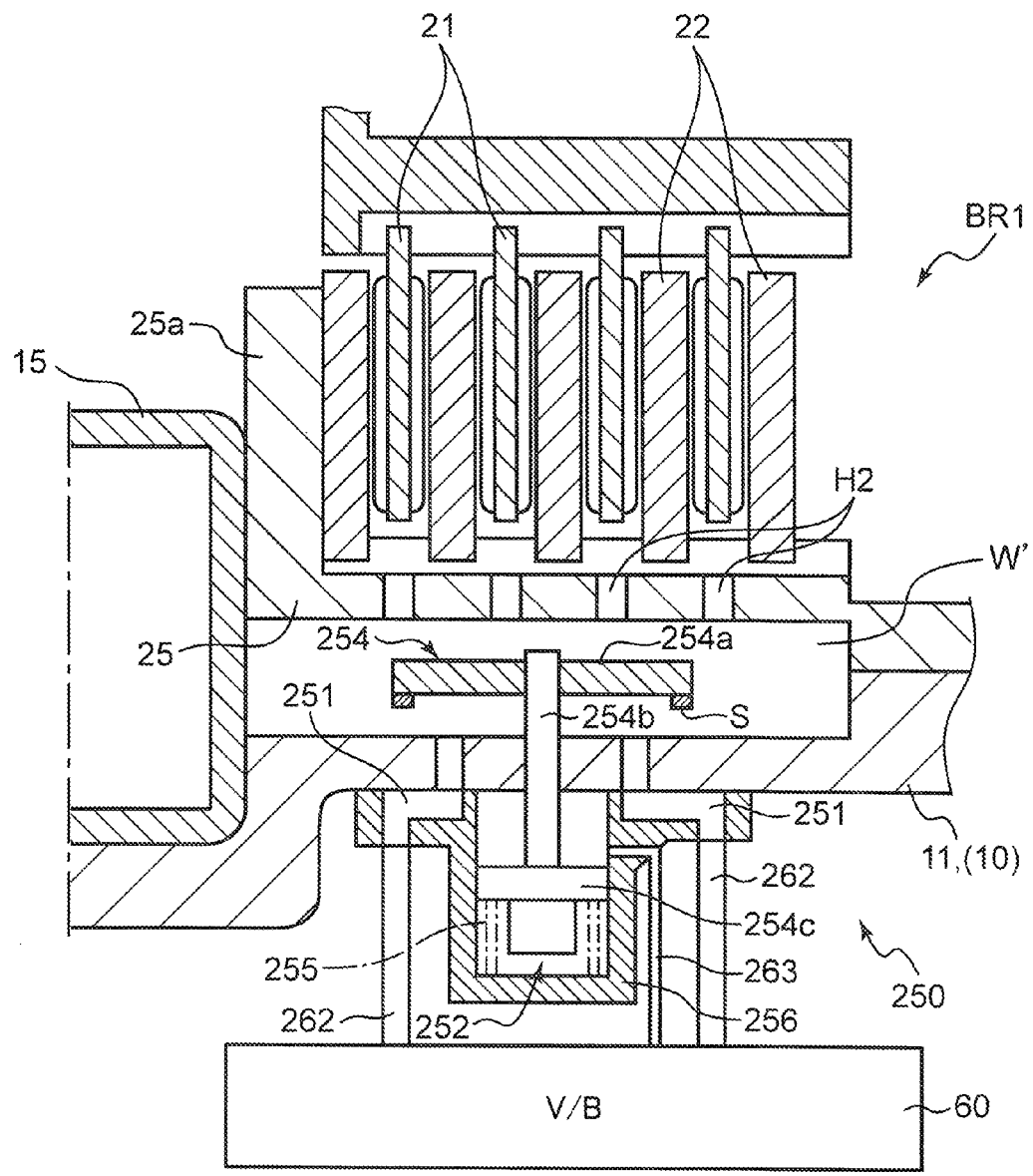
FIG. 11 is a diagram for describing a second modification of the embodiment.

FIG. 11 illustrates a lubrication oil discharge section 250 as the second modification. The lubrication oil discharge section 250 is provided with a discharge hole 251, a discharge control valve 252, and a cap member 256. The specific configuration of these elements is similar to the first modification (see FIG. 9 and FIG. 10). Therefore, in the following, the configuration of the second modification is described mainly on the differences with respect to the first modification.

The discharge control valve 252 includes a valve body 254 and a return spring 255. The valve body 254 includes an umbrella portion 254a, a shaft portion 254b, and a pressed portion 254c in this order from the upper side. Unlike the first modification, the return spring 255 is disposed between the lower surface of the cap member 256 and the pressed portion 254c, and urges the valve body 254 upward.

The inner space of the cap member 256 on the upper side than the pressed portion 254c communicates with a valve body 60 through an oil passage 263. Further, the discharge hole 251 communicates with the valve body 60 through an oil passage 262.

In the second modification as described above, when the hydraulic pressure of hydraulic oil to be supplied from the oil passage 263 is small, the valve body 254 is pressed upward by the urging force of the return spring 255. FIG. 11 illustrates this state. Then, the discharge hole 251 is opened to allow discharge of lubrication oil. On the other hand, when the hydraulic pressure of hydraulic oil to be supplied from the oil passage 263 is large, the valve body 254 is pressed downward against the urging force of the return spring 255, and a seat portion S on the lower surface of the umbrella portion 254a is sealably pressed against the transmission case 10. Then, the discharge hole 251 is closed, and discharge of lubrication oil is stopped.

The discharge control valve 152 in the first modification and the discharge control valve 252 in the second modification are configured to switch whether or not lubrication oil is discharged by opening or closing the discharge holes 151 and 251. Alternatively, a discharge control valve may be configured to open or close slits to be formed in the lower portion of the holding member 25. A specific example in this case is described as a third modification.

Figure 12:
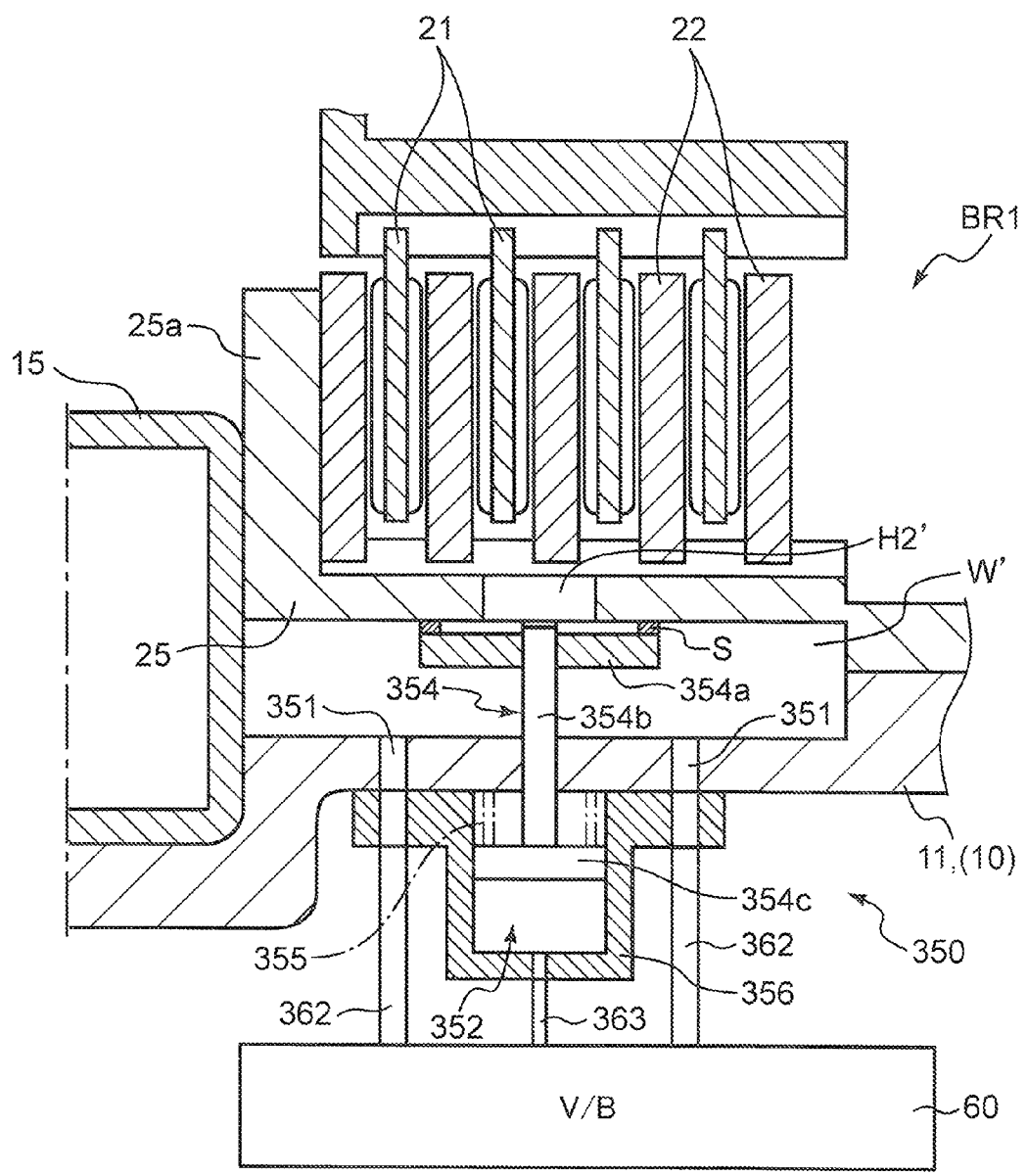
FIG. 12 is a diagram for describing a third modification of the embodiment.

FIG. 12 illustrates a lubrication oil discharge section 350 as the third modification. The lubrication oil discharge section 350 is provided with a discharge hole 351. a discharge control valve 352 and a cap member 356. A single slit H2' of a relatively wide area is formed in the lower portion of a holding member 25. The discharge control valve 352 is used to open or close the slit H2'.

The discharge control valve 352 includes a valve body 354 and a return spring 355. The valve body 354 includes an umbrella portion 354a, a shaft portion 354b. and a pressed portion 354c in this order from the upper side. A seat portion S which is sealably pressed against the lower surface of the holding member 25 in vicinity of the slit H2' is mounted on the upper surface of the periphery of the umbrella portion 354a. The return spring 355 is disposed between the pressed portion 354c and the lower surface of the transmission case 10, and urges the valve body 354 downward.

The inner space of the cap member 356 on the lower side than the pressed portion 354c communicates with a valve body 60 through an oil passage 363. Further, the discharge hole 351 communicates with the valve body 60 through an oil passage 362.

In the third modification as described above, when the hydraulic pressure of hydraulic oil to be supplied from the oil passage 363 is large, the valve body 354 is pressed upward against the urging force of the return spring 355, and the seat portion S on the upper surface of the umbrella portion 354a is sealably pressed against the lower surface of the holding member 25. FIG. 12 illustrates this state. Then, the slit H2' in the holding member 25 is closed, and discharge of lubrication oil is stopped. On the other hand, when the hydraulic pressure of hydraulic oil to be supplied from the oil passage 363 is small, the valve body 354 is pressed downward by the urging force of the return spring 355. Then, the slit H2' is opened, and discharge of lubrication oil is allowed.

(6) Summary

The following is a summary of the embodiment and the modifications thereof.

An automatic transmission according to an aspect of the present invention is provided with a brake device including a rotatable rotation-side friction plate interconnected with a predetermined rotation element, and a non-rotatable fixed-side friction plate disposed to face the rotation-side friction plate, the brake device being switchable between an engaged state where the friction plates are brought into pressing contact with each other, and a released state where the engaged state is released; a transmission case which accommodates the brake device; a lubrication oil supply section which supplies lubrication oil introduced into the transmission case to an upper portion of the brake device; and a lubrication oil discharge section disposed below the brake device, and configured to discharge lubrication oil supplied from the lubrication oil supply section to the brake device.

In the aforementioned configuration of the present invention, lubrication oil is supplied from the lubrication oil supply section to the upper portion of the brake device. This makes it possible to efficiently supply lubrication oil to the upper portion of the brake device where lubrication oil is generally less likely to reach. This is advantageous in preventing deterioration of the upper portion of the brake device by heat. For instance, let us consider a structure of a general automatic transmission, in which a lubrication oil storage portion is disposed below a transmission case. In this case, typically, lubrication oil is supplied from below the transmission case, or is supplied from a power transmission shaft located at the middle of the transmission case, in order to cool a brake device by lubrication oil. However, if lubrication oil is supplied from below the transmission case or from the middle of the transmission case, although lubrication oil is securely supplied to the lower portion of the brake device, lubrication oil is less likely to reach the upper portion of the brake device in a condition that the rotation speed of the rotation-side friction plate is low (in other words, in a condition that a centrifugal force to be applied to lubrication oil is small). As a result, the upper portion of the brake device may be easily deteriorated by heat. On the other hand, in the configuration of the present invention, in which lubrication oil is supplied from the lubrication oil supply section to the upper portion of the brake device, lubrication oil of a low temperature is securely supplied to the upper portion of the brake device, and the supplied lubrication oil spreads over the entirety of the brake device by the gravitational force. This makes it possible to uniformly cool the brake device. This is advantageous in preventing deterioration of the brake device by heat. Further, lubrication oil is discharged from the lubrication oil discharge section formed below the brake device. This makes it possible to speedily discharge lubrication oil when lubrication oil is not necessary. This is advantageous in reducing drag resistance of the rotation-side friction plate.

Preferably, the automatic transmission may further include a lubrication oil flow section formed independently of or integrally with the transmission case, the lubrication oil flow section serving as an oil passage for guiding lubrication oil introduced into the transmission case to the lubrication oil supply section.

According to the aforementioned configuration, it is possible to securely guide lubrication oil stored in a portion below the transmission case to the lubrication oil supply section, which is disposed above the transmission case, through the lubrication oil flow section.

In the aforementioned configuration, preferably, the automatic transmission may further include a planetary gear set provided with a sun gear, a plurality of pinions engaged with the sun gear, and a ring gear engaged with each of the pinions, wherein the lubrication oil flow section is disposed at such a position that at least a part of the lubrication oil flow section overlaps the planetary gear set when viewed in a radial direction.

Alternatively, the automatic transmission may be further provided with a clutch device including a rotatable input-side friction plate and a rotatable output-side friction plate disposed to face each other, the clutch device being switchable between an engaged state where the friction plates are brought into pressing contact with each other, and a released state where the engaged state is released, wherein the lubrication oil flow section is disposed at such a position that at least a part of the lubrication oil flow section overlaps the clutch device when viewed in a radial direction.

According to any one of the aforementioned configurations, it is possible to prevent oversizing of the automatic transmission in the axial direction accompanied by addition of the lubrication oil flow section as much as possible. This makes it possible to appropriately secure an oil passage through which lubrication oil of a sufficient amount is allowed to flow within the lubrication oil flow section, while making the automatic transmission compact in the axial direction.

In the aforementioned configuration, preferably, the automatic transmission may be further provided with an engagement hydraulic chamber to which a hydraulic pressure for use in engaging the brake device is supplied, wherein the lubrication oil flow section is disposed on a side opposite to the engagement hydraulic chamber with respect to the brake device.

As described above, when the lubrication oil flow section is disposed on the side opposite to the engagement hydraulic chamber, it is possible to eliminate an influence such as constraints in the installation area of the lubrication oil flow section due to the existence of the engagement hydraulic chamber. This is advantageous in sufficiently securing the volume of the lubrication oil flow section.

Preferably, the lubrication oil discharge section may include a discharge control valve which is openably and closably provided to control discharge of lubrication oil from the brake device.

According to the aforementioned configuration, it is possible to appropriately control discharge of lubrication oil from the brake device with use of the discharge control valve.

Preferably, the lubrication oil supply section may include a supply control valve which is openably and closably provided to control supply of lubrication oil to the brake device.

According to the aforementioned configuration, it is possible to appropriately control supply of lubrication oil to the brake device with use of the supply control valve.

In the aforementioned configuration, preferably, the supply control valve may be controlled by an engagement hydraulic pressure for use in engaging the brake device.

According to the aforementioned configuration, it is possible to drive the supply control valve in association with a change in the state of the brake device. This makes it possible to appropriately supply lubrication oil when cooling of the brake device is necessary.

The present invention is advantageously applicable to a vehicular automatic transmission, namely, to an automatic transmission provided with an input shaft to which a driving force is input from a power source mounted in a vehicle. In this configuration, it is possible to slip-control the brake device when the vehicle is started. Further, in this configuration. it is possible to connect the input shaft to the power source without via a power transmission device (a torque converter) using fluid.

Specifically, in the present invention, it is possible to sufficiently enhance the cooling performance with respect to the brake device. Therefore, even when the brake device is slip-controlled when a vehicle is started as the aforementioned configuration, it is possible to appropriately protect the brake device from frictional heat generated accompanied by the slip-control. Further, slip-controlling the brake device when a vehicle is started makes it possible to use the brake device as a substitute for a torque converter. This makes it possible to abolish a torque converter.

Further, an automatic transmission according to another aspect of the invention is provided with a brake device including a rotatable rotation-side friction plate interconnected with a predetermined rotation element, and a non-rotatable fixed-side friction plate disposed to face the rotation-side friction plate, the brake device being switchable between an engaged state where the friction plates are brought into pressing contact with each other, and a released state where the engaged state is released; a transmission case which accommodates the brake device; a lubrication oil flow section through which lubrication oil introduced into the transmission case is allowed to flow; a lubrication oil supply section which supplies lubrication oil within the lubrication oil flow section to an upper portion of the brake device; and an engagement hydraulic chamber to which a hydraulic pressure for use in engaging the brake device is supplied, wherein the lubrication oil flow section is disposed on a side opposite to the engagement hydraulic chamber with respect to the brake device.

In the aforementioned configuration of the present invention, lubrication oil is supplied from the lubrication oil supply section to the upper portion of the brake device. Therefore, it is possible to efficiently supply lubrication oil to the upper portion of the brake device where lubrication oil is generally less likely to reach. This is advantageous in preventing deterioration of the upper portion of the brake device by heat. Further, the lubrication oil flow section is disposed on the side opposite to the engagement hydraulic chamber. This makes it possible to eliminate an influence such as constraints in the installation area of the lubrication oil flow section due to the existence of the engagement hydraulic chamber. This is advantageous in sufficiently securing the volume of the lubrication oil flow section.

This application is based on Japanese Patent Application No. 2015-175034 filed on Sep. 4, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automatic transmission comprising:
    a brake device including a rotatable rotation-side friction plate interconnected with a predetermined rotation element, and a non-rotatable fixed-side friction plate disposed to face the rotation-side friction plate, the brake device being switchable between an engaged state where the friction plates are brought into pressing contact with each other, and a released state where the engaged state is released;
    a transmission case which accommodates the brake device;
    a lubrication oil supply section which supplies lubrication oil introduced into the transmission case to an upper portion of the brake device; and
    a lubrication oil discharge section disposed below the brake device, and configured to discharge lubrication oil supplied from the lubrication oil supply section to the brake device.

2. The automatic transmission according to claim 1, further comprising:
    a lubrication oil flow section formed independently of or integrally with the transmission case, the lubrication oil flow section serving as an oil passage for guiding, lubrication oil introduced into the transmission case to the lubrication oil supply section.

3. The automatic transmission according to claim 2, further comprising:
    a planetary gear set including a sun gear, a plurality of pinions engaged with the sun gear, and a ring gear engaged with each of the pinions, wherein
    the lubrication oil flow section is disposed at such a position that at least a part of the lubrication oil flow section overlaps the planetary gear set when viewed in a radial direction.

4. The automatic transmission according to claim 3, further comprising:
    a clutch device including a rotatable input-side friction plate and a rotatable output-side friction plate disposed to face each other, the clutch device being switchable between an engaged state where the friction plates are brought into pressing contact with each other, and a released state where the engaged state is released, wherein
    the lubrication oil flow section is disposed at such a position that at least a part of the lubrication oil flow section overlaps the clutch device when viewed in a radial direction.

5. The automatic transmission according to claim 4, further comprising:
    an engagement hydraulic chamber to which a hydraulic pressure for use in engaging the brake device is supplied, wherein
    the lubrication oil flow section is disposed on a side opposite to the engagement hydraulic chamber with respect to the brake device.

6. The automatic transmission according to claim 5, wherein
    the lubrication oil discharge section includes a discharge control valve which is openably and closably provided to control discharge of lubrication oil from the brake device.

7. The automatic transmission according to claim 6, wherein
    the lubrication oil supply section includes a supply control valve which is openably and closably provided to control supply of lubrication oil to the brake device.

8. The automatic transmission according to claim 7, wherein
    the supply control valve is controlled by an engagement hydraulic pressure for use in engaging the brake device.

9. The automatic transmission according to claim 8, further comprising:
    an input shaft to which a driving force is input from a power source mounted in a vehicle, wherein
    the brake device is slip-controlled when the vehicle is started.

10. The automatic transmission according to claim 9, wherein
    the input shaft is connected to the power source without via a power transmission device using fluid.

11. The automatic transmission according to claim 2, further comprising:
    a clutch device including a rotatable input-side friction plate and a rotatable output-side friction plate disposed to face each other, the clutch device being switchable between an engaged state where the friction plates are brought into pressing contact with each other, and a released state where the engaged state is released, wherein
    the lubrication oil flow section is disposed at such a position that at least a part of the lubrication oil flow section overlaps the clutch device when viewed in a radial direction.

12. The automatic transmission according to claim 2, further comprising:

an engagement hydraulic chamber to which a hydraulic pressure for use in engaging the brake device is supplied, wherein the lubrication oil flow section is disposed on a side opposite to the engagement hydraulic chamber with respect to the brake device.

13. The automatic transmission according to claim 2, wherein the lubrication oil discharge section includes a discharge control valve which is openably and closably provided to control discharge of lubrication oil from the brake device.

14. The automatic transmission according to claim 1, wherein the lubrication oil discharge section includes a discharge control valve which is openably and closably provided to control discharge of lubrication oil from the brake device.

15. The automatic transmission according to claim 14, wherein the lubrication oil supply section includes a supply control valve which is openably and closably provided to control supply of lubrication oil to the brake device.

16. The automatic transmission according to claim 1, wherein the lubrication oil supply section includes a supply control valve which is openably and closably provided to control supply of lubrication oil to the brake device.

17. The automatic transmission according to claim 16, wherein the supply control valve is controlled by an engagement hydraulic pressure for use in engaging the brake device.

18. The automatic transmission according to claim 1, further comprising:

an input shaft to which a driving force is input from a power source mounted in a vehicle, wherein the brake device is slip-controlled when the vehicle is started.

19. The automatic transmission according to claim 18, wherein the input shaft is connected to the power source without via a power transmission device using fluid.

20. An automatic transmission comprising:

a brake device including a rotatable rotation-side friction plate interconnected with a predetermined rotation element, and a non-rotatable fixed-side friction plate disposed to face the rotation-side friction plate, the brake device being switchable between an engaged state where the friction plates are brought into pressing contact with each other, and a released state where the engaged state is released;

a transmission case which accommodates the brake device;

a lubrication oil flow section through which lubrication oil introduced into the transmission case is allowed to flow;

a lubrication oil supply section which supplies lubrication oil within the lubrication oil flow section to an upper portion of the brake device; and an engagement hydraulic chamber to which a hydraulic pressure for use in engaging the brake device is supplied, wherein the lubrication oil flow section is disposed on a side opposite to the engagement hydraulic chamber with respect to the brake device.

* * * * *